(12) United States Patent
Yang et al.

(10) Patent No.: US 12,510,949 B2
(45) Date of Patent: Dec. 30, 2025

(54) MANAGING POWER STATES OF AN INFORMATION HANDLING SYSTEM

(71) Applicant: Dell Products L.P., Round Rock, TX (US)

(72) Inventors: Cheng-Hung Yang, Taipei (TW); Isaac Qin Wang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 168 days.

(21) Appl. No.: 18/507,232

(22) Filed: Nov. 13, 2023

(65) Prior Publication Data
US 2025/0155952 A1    May 15, 2025

(51) Int. Cl.
| | | |
|---|---|---|
| G06F 1/00 | (2006.01) | |
| G01R 33/07 | (2006.01) | |
| G01R 33/09 | (2006.01) | |
| G06F 1/16 | (2006.01) | |
| G06F 1/3206 | (2019.01) | |
| G06F 1/3234 | (2019.01) | |

(52) U.S. Cl.
CPC ........... *G06F 1/3234* (2013.01); *G01R 33/07* (2013.01); *G01R 33/093* (2013.01); *G06F 1/1616* (2013.01); *G06F 1/1677* (2013.01); *G06F 1/3206* (2013.01)

(58) Field of Classification Search
CPC .... G06F 1/3234; G06F 1/1616; G06F 1/1677; G06F 1/3206; G01R 33/07; G01R 33/093
See application file for complete search history.

(56) References Cited

U.S. PATENT DOCUMENTS

| | | | |
|---|---|---|---|
| 2010/0100202 A1* | 4/2010 | Chen | G06F 1/1677 700/75 |
| 2016/0349909 A1* | 12/2016 | Lu | G06F 3/0227 |
| 2017/0010657 A1* | 1/2017 | Schneider | G06F 1/3206 |
| 2017/0168631 A1* | 6/2017 | Roberts-Hoffman | G06F 3/04883 |
| 2018/0165429 A1* | 6/2018 | Leong | G06F 3/0346 |
| 2018/0314316 A1* | 11/2018 | Xu | G06F 1/1677 |
| 2021/0011520 A1* | 1/2021 | Bhat | G06F 1/1679 |
| 2025/0155952 A1* | 5/2025 | Yang | G06F 1/1616 |

* cited by examiner

*Primary Examiner* — Xuxing Chen
(74) *Attorney, Agent, or Firm* — McDermott Will & Schulte LLP

(57) ABSTRACT

Managing power states of an IHS, including: identifying, at a first time, an output of a first sensor, a first output of a second sensor, and a second output of the second sensor, the first sensor and the second sensor detecting a presence of one or more magnetic fields; determining, based on the output of the first, second, and the third sensors, that a power state of the information handling system as a working power state, and in response, and at a second time after the first time: determining that the first output of the second sensor changed from a first state to a second state; determining that the output of the first sensor is in the second state; and in response to determining that the output of the first sensor is in the second state, adjusting the power state of the IHS to a low-power state.

18 Claims, 11 Drawing Sheets

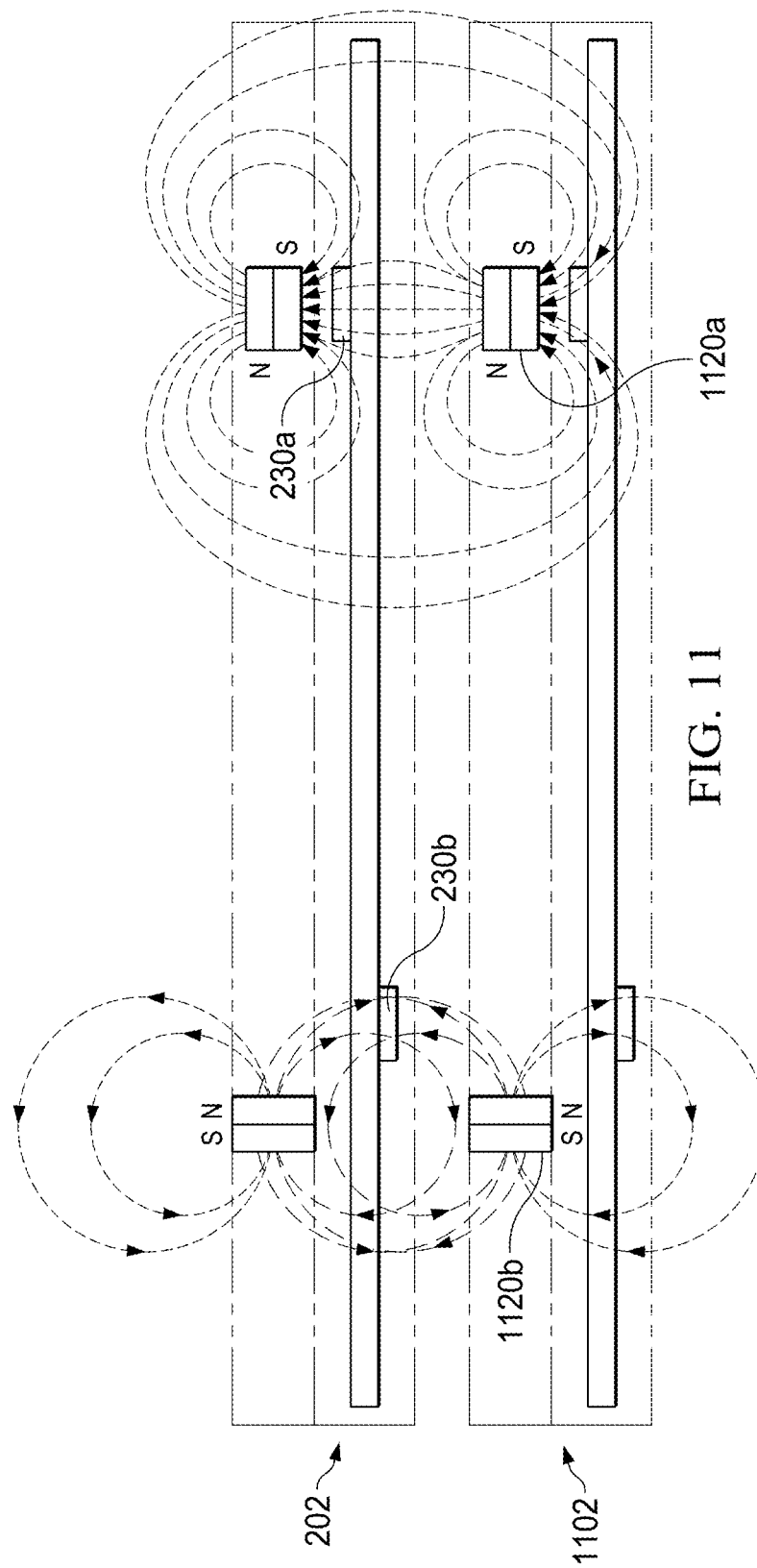

MANAGING POWER STATES OF AN INFORMATION HANDLING SYSTEM

BACKGROUND

Field of the Disclosure

The disclosure relates generally to an information handling system, and in particular, managing power states of the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Unintended platform auto power-on/power-off of the information handling system is undesirable (e.g., when the information handling systems are vertically or horizontally stacked or adjacent to one another).

SUMMARY

Innovative aspects of the subject matter described in this specification may be embodied in a method of managing power states of an information handling system, including managing power states of an information handling system, including: identifying, at a first time, an output of a first sensor, a first output of a second sensor, and a second output of the second sensor, the first sensor and the second sensor detecting a presence of one or more magnetic fields, the first sensor positioned at a first end of a first body of a two-body information handling system, the second sensor positioned at a second end of the first body of the first body of the two-body information handling system, the second end opposite to the first end; determining, based on the output of the first, second, and the third sensors, that a power state of the information handling system as a working power state; in response to determining that the information handling system is in the working power state, and at a second time after the first time: determining that the first output of the second sensor changed from a first state to a second state; in response to determining that the first output of the second sensor changed to the second state, determining that the output of the first sensor is in the second state; and in response to determining that the output of the first sensor is in the second state, adjusting the power state of the information handling system to a low-power state.

Other embodiments of these aspects include corresponding systems and apparatus.

These and other embodiments may each optionally include one or more of the following features. For instance, further in response to determining that the first output of the second sensor changed from the first state to the second state, determining that the output of the first sensor is in the first state; and in response to determining that the output of the first sensor is in the first state, maintaining the power state of the information handling system as the working power state. In response to determining that the information handling system is in the working power state, determining that the first output of the second sensor is unchanged; and in response to determining that first output of the second sensor is unchanged, maintaining the power state of the information handling system as the working power state. Determining, based on the output of the first, second, and third sensors, that the power state of the information handling system as the low-power state; in response to determining that the information handling system is in the low-power state, and at the second time after the first time: determining that the first output of the second sensor changed from the second state to the first state; in response to determining that the first output of the second sensor changed from the to the first state, determining that the output of the first sensor is in the first state; and in response to determining that the output of the first sensor is in the first state, adjusting the power state of the information handling system to the working power state. Further in response to determining that the first output of the second sensor changed from the second state to the first state, determining that the output of the first sensor is the second state; and in response to determining that the output of the first sensor is in the second state, maintaining the power state of the information handling system as the low-power state. In response to determining that the information handling system is in the low-power state, determining that the first output of the second sensor is unchanged; and in response to determining that first output of the second sensor is unchanged, maintaining the power state of the information handling system as the low-power state. The first sensor, the second sensor, or both are Hall sensors. The first sensor, the second sensor, or both are giant magnetoresistance (GMR) sensors. The first state indicates no detection of the one or more magnetic fields, and the second state indicates a detection of the one or more magnetic fields.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIG. 11 illustrates a perspective view of the information handling system, in a closed state, stacked on another information handling system.

DESCRIPTION OF PARTICULAR EMBODIMENT(S)

This disclosure discusses methods and systems for managing power states of an information handling system. In short, sensors can indicate a detection or no detection of magnetic fields (e.g., from magnets). Based on such, a power state can be determined to place the information handling system in (that can also be correlated to a physical positioning of the information handling system) a corresponding power state.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-11 wherein like numbers are used to indicate like and corresponding parts.

Figure 1:
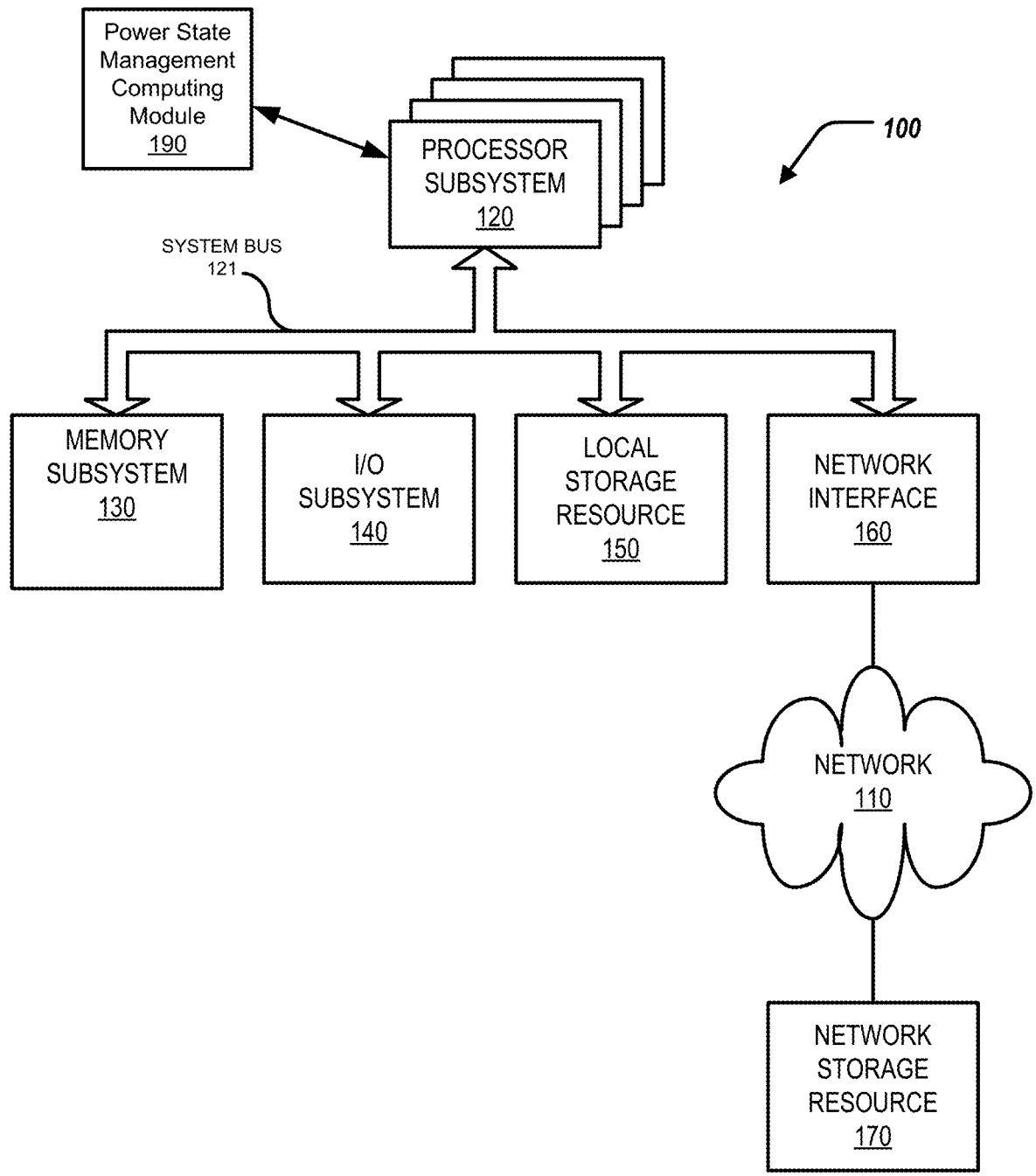
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource 170 may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system names. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a power state management computing module 190. The power state management computing module 190 can be in communication with the processor subsystem 120, or included by the processor subsystem 120. In some examples, the power state management computing module 190 is included by an embedded controller (EC) of the information handling system 100.

Figure 2:
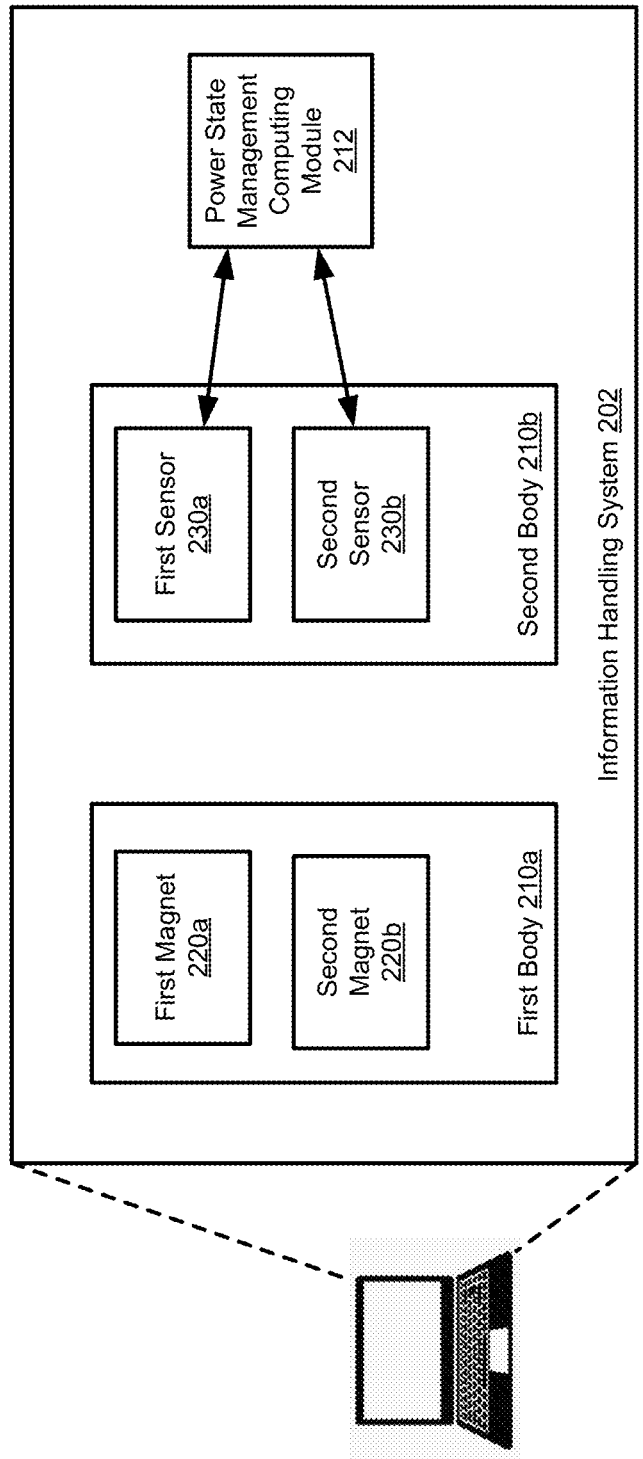
FIG. 2 illustrates a block diagram of the information handling system.

Turning to FIG. 2, FIG. 2 illustrates an environment 200 including an information handling system 202. The information handling system 202 can include a first body 210*a* and a second body 210*b* (collectively referred to as bodies 210). The information handling system 202 can include a power state management computing module 212. The first body 210*a* can include a first magnet 220*a* and a second magnet 220*b* (collectively referred to as magnets 220). The second body 210*b* can include a first sensor 230*a* and a second sensor 230*b* (collectively referred to as sensors 230). In some examples, the information handling system 202 is similar to, or includes, the information handling system 100 of FIG. 1. In some examples, the power state management computing module 212 is the same, or substantially the same, as the power state management computing module 190 of FIG. 1.

The power state management computing module 212 can be in communication with the sensors 230.

Figure 3:
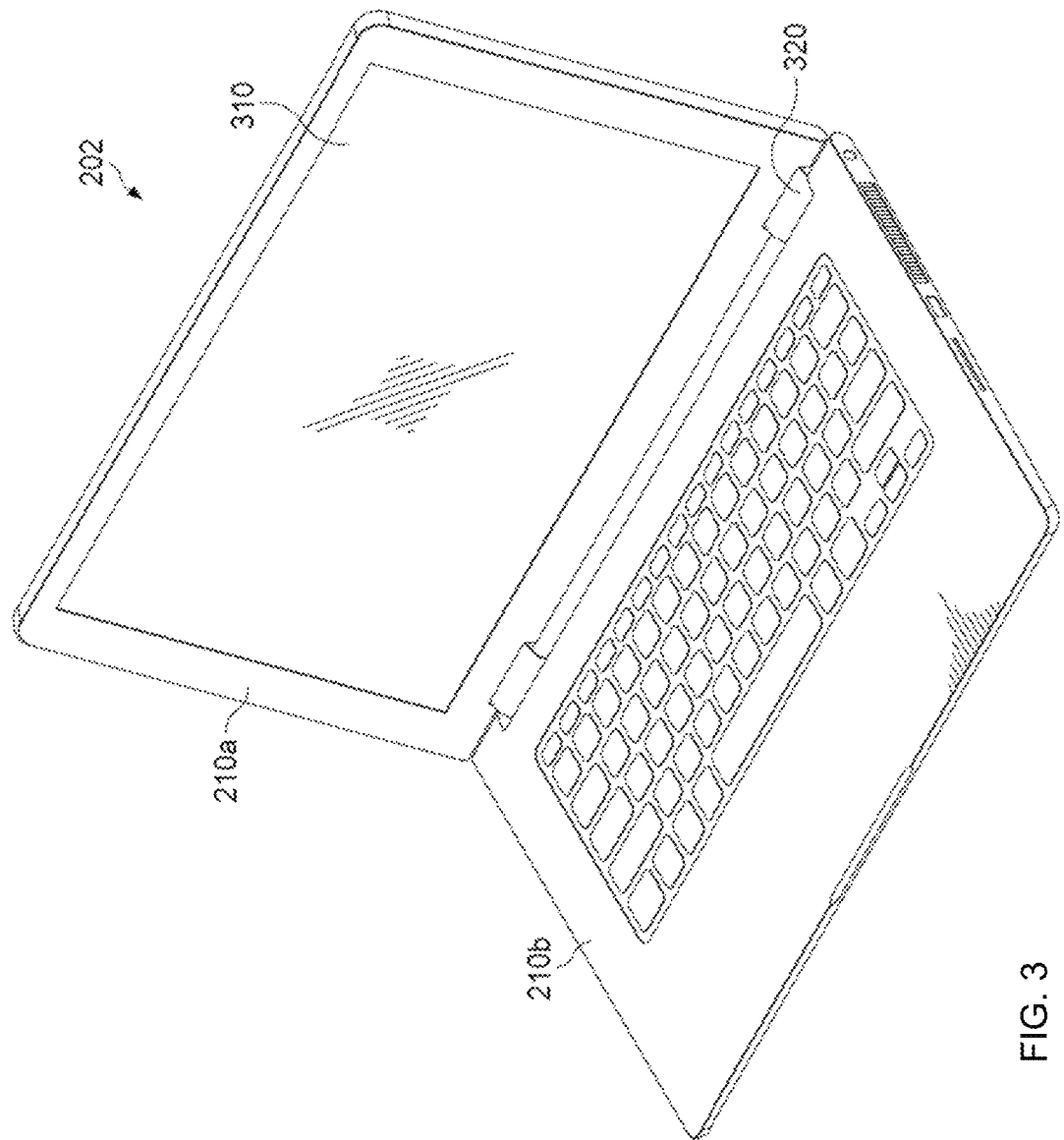
FIG. 3 illustrates a perspective view of the information handling system, in an open state.

FIG. 3 illustrates a perspective view of the information handling system 202, in an open state. The information handling system 202 can include the first body 210*a* and the second body 210*b*. The first body 210*a* can include a display 310. A hinge 320 can couple the first body 210*a* to the second body 210*b*.

In short, the power state management computing module 212 can receive data from the sensors 230 indicating a detection or no detection of magnetic fields (e.g., from the magnets 220). Based on such, the power state management computing module 212 can determine a power state to place the information handling system 202 in (that can also be correlated to a physical positioning of the information handling system 202).

Figure 4:
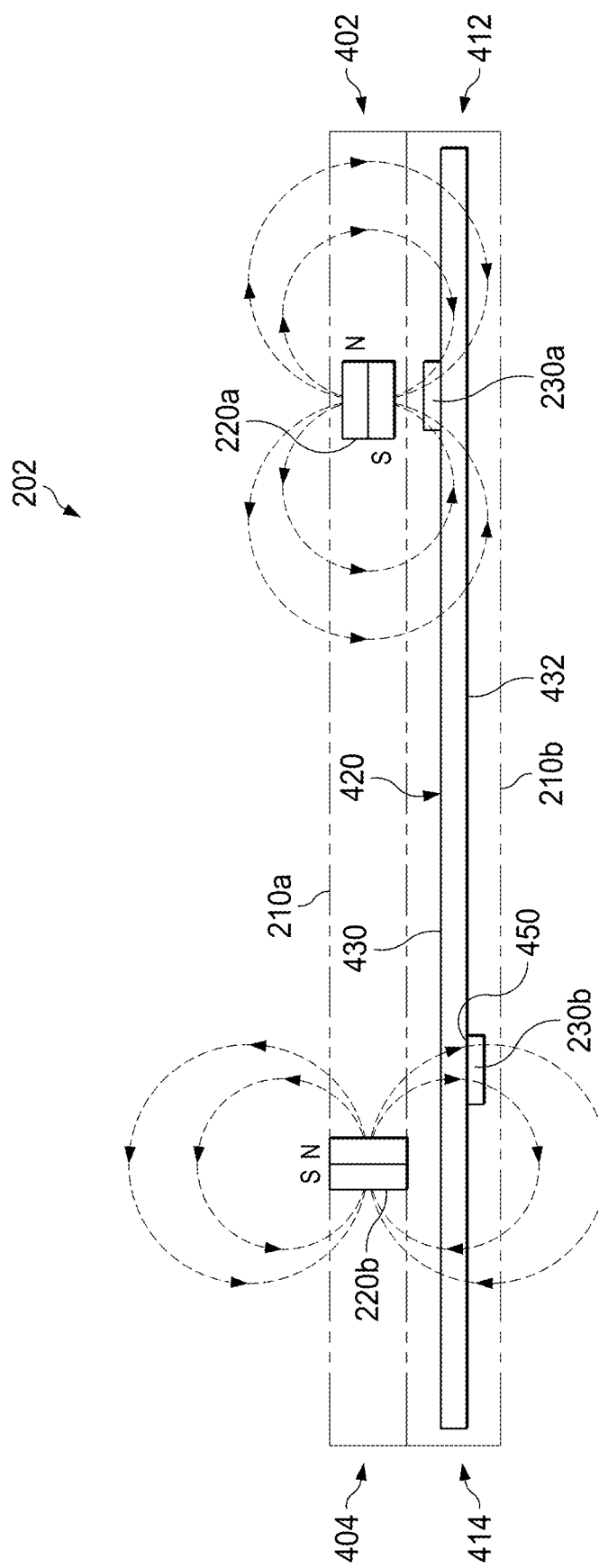
FIG. 4 illustrates a perspective view of the information handling system, in a closed state.

FIG. 4 illustrates the information handling system 202, in a closed state. Specifically, the first body 210*a* includes the first magnet 220*a* and the second magnet 220*b*. In some examples, the first magnet 220*a* is positioned at a first end 402 of the first body 210*a*; and the second magnet 220*b* is positioned at a second end 404 of the first body 210*a*. In some examples, the first magnet 220*a* is positioned along a first axis and the second magnet 220*b* is positioned along a second axis transverse to the first direction. For example, when the information handling system 202 is in a standard position used by a user (e.g., set on a table), the first axis can be considered "vertical" and the second axis can be considered "horizontal."

The second body 210*b* includes the first sensor 230*a* and the second sensor 230*b*. In some examples, the first sensor 230*a* is positioned at a first end 412 of the second body 210*b*; and the second sensor 230*b* is positioned at a second end 414 of the second body 210b. In some examples, the second body 210b can include a printed circuit board (PCB) 420 (or motherboard). In some examples, the sensors 230 can be coupled to the PCB 420. In some examples, the sensor 230a is coupled to a first side 430 of the PCB 420; and the sensor 230b is coupled to a second side 432 of the PCB 420.

In some examples, when the information handling system 202 is in the closed state, the first magnet 220a is positioned proximate to the first sensor 230a, and the second magnet 220b is positioned proximate to the second sensor 230b.

In some examples, the sensors 230 can detect magnetic fields. For example, the sensors 230 can detect the magnetic fields produced by the magnets 220, describe further herein. In some examples the first sensor 230a, the second sensor 230b, or both, are Hall sensors. In some examples the first sensor 230a, the second sensor 230b, or both, are giant magnetoresistance (GMR) sensors. In some examples, the second sensor 230b is a dual-output sensor.

In some examples, the first sensor 230a generates an output indicating a detection or no detection of one or more magnetic fields; and the second sensor 230b generates a first output and a second output indicating a detection of or no detection of one or more magnetic fields. For example, the second sensor 230b can detect a directionality of the magnetic fields indicated by the first and the second outputs thereof, described further herein.

To that end, when the information handling system 202 is in the closed state, the outputs of the sensors 230 can indicate certain respective states that are reflective of the information handling system 202 being in the closed state. Specifically, when the information handling system 202 is in the closed state (as shown in FIG. 4), the first sensor 230a can detect the magnetic fields generated by the first magnet 220a, and generate an output in a second state indicating such (e.g., a "high" state). Further, when the information handling system 202 is in the closed state, the second sensor 230b can detect the magnetic fields generated by the second magnet 220b in a first direction (e.g., the second magnet 220b is "above" the second sensor 230b), and generate a first output in the second state (e.g., a "high" state) and generates a second output in a first state (e.g., a "low" state) to indicate such. Thus, when the output of the first sensor 230a is in the second state, the first output of the second sensor 230b is in the second state, and the second output of the second sensor 230b is in the first state, the power state management computing module 212 can receive data indicating such outputs, and based on such, determine that the information handling system 202 is in the closed state.

In some examples, the second sensor 230b detects the magnetic fields generated by the second magnet 220b from a first side 450 of the second sensor 230b. That is, the second sensor 230b detects the magnetic fields generated by the second magnet 220b as the magnetic fields encounter the first side 450 of the second sensor 230b. Thus, the second sensor 230b, based on detecting the magnetic fields from the first side 450 of the second sensor 230b, can determine a positional relationship of the second magnet 220b with respect to the second sensor 230b. Specifically, the second sensor 230b, based on detecting the magnetic fields from the first side 450 of the second sensor 230b, generates the first output in the second state (e.g., a "high" state) and generates the second output in the first state (e.g., a "low" state) to indicate the positional relationship of the second magnet 220b with respect to the second sensor 230b (e.g., the second magnet 220b is "above" the second sensor 230b).

In some examples, when the information handling system 202 is in the closed state, the information handling system 202 can be considered to be in a low-power state. For example, a low-power state of the information handling system 202 can include a S5 power state.

Figure 5:
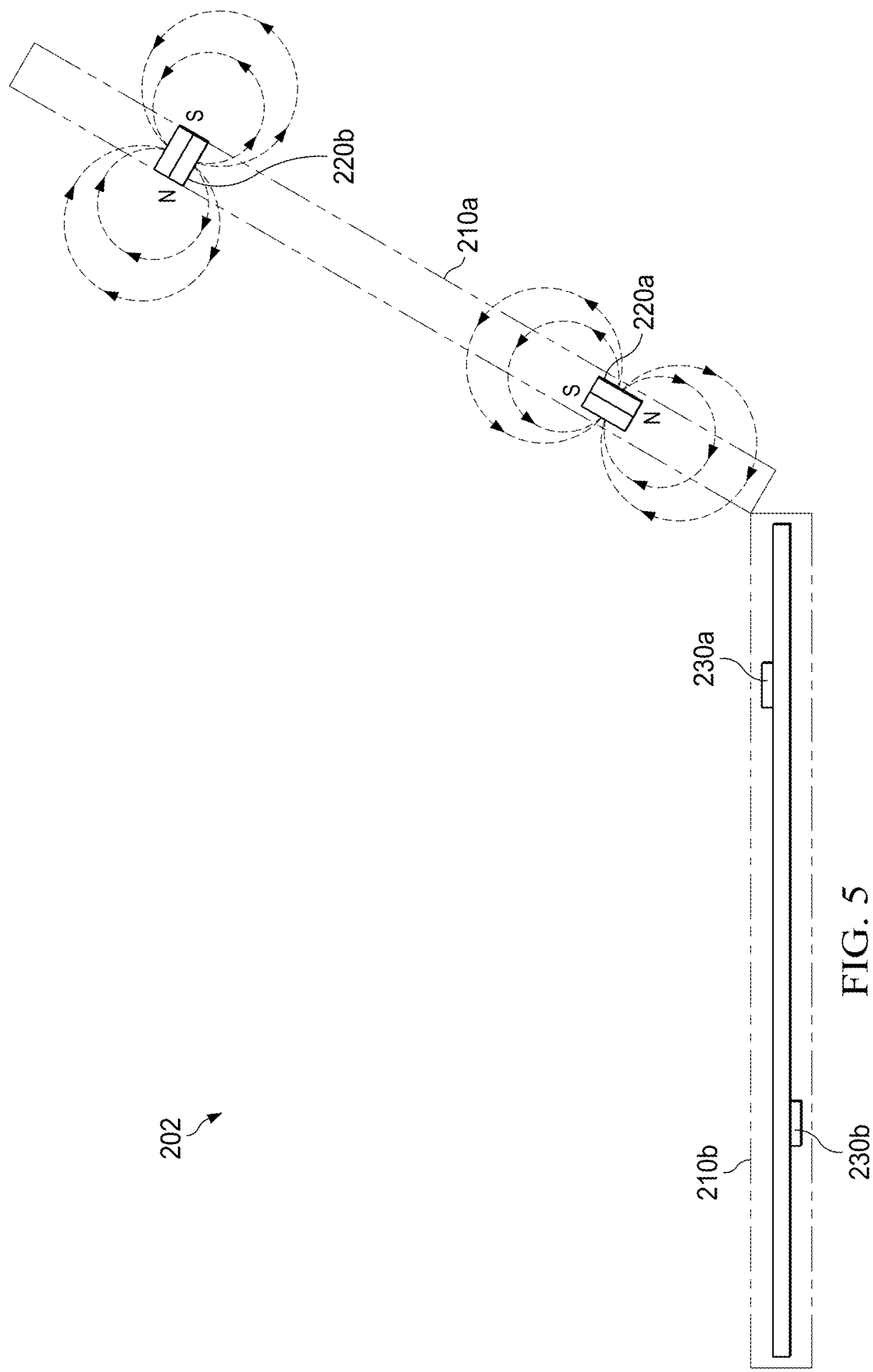
FIG. 5 illustrates a perspective view of the information handling system, in an open state.

FIG. 5 illustrates the information handling system 202, in an open state. To that end, when the information handling system 202 is in the open state, the outputs of the sensors 230 can indicate certain respective states that are reflective of the information handling system 202 being in the open state. Specifically, when the information handling system 202 is in the open state, the first sensor 230a does not detect the magnetic fields generated by the first magnet 220a (or any magnets), and generates an output in the first state indicating such (e.g., a "low" state). Further, when the information handling system 202 is in the open state, the second sensor 230b does not detect the magnetic fields generated by the second magnet 220b (or any magnets), and generates the first output in the first state (e.g., a "low" state) and generates the second output in the first state (e.g., a "low" state) to indicate such. Thus, when the output of the first sensor 230a is in the first state, the first output of the second sensor 230b is in the first state, and the second output of the second sensor 230b is in the first state, the power state management computing module 212 can receive data indicating such outputs, and based on such, determine that the information handling system 202 is in the open state.

In some examples, when the information handling system 202 is in the open state, the information handling system 202 can be considered to be in a working power state. For example, a working power state of the information handling system 202 can include a S0 power state.

Figure 6:
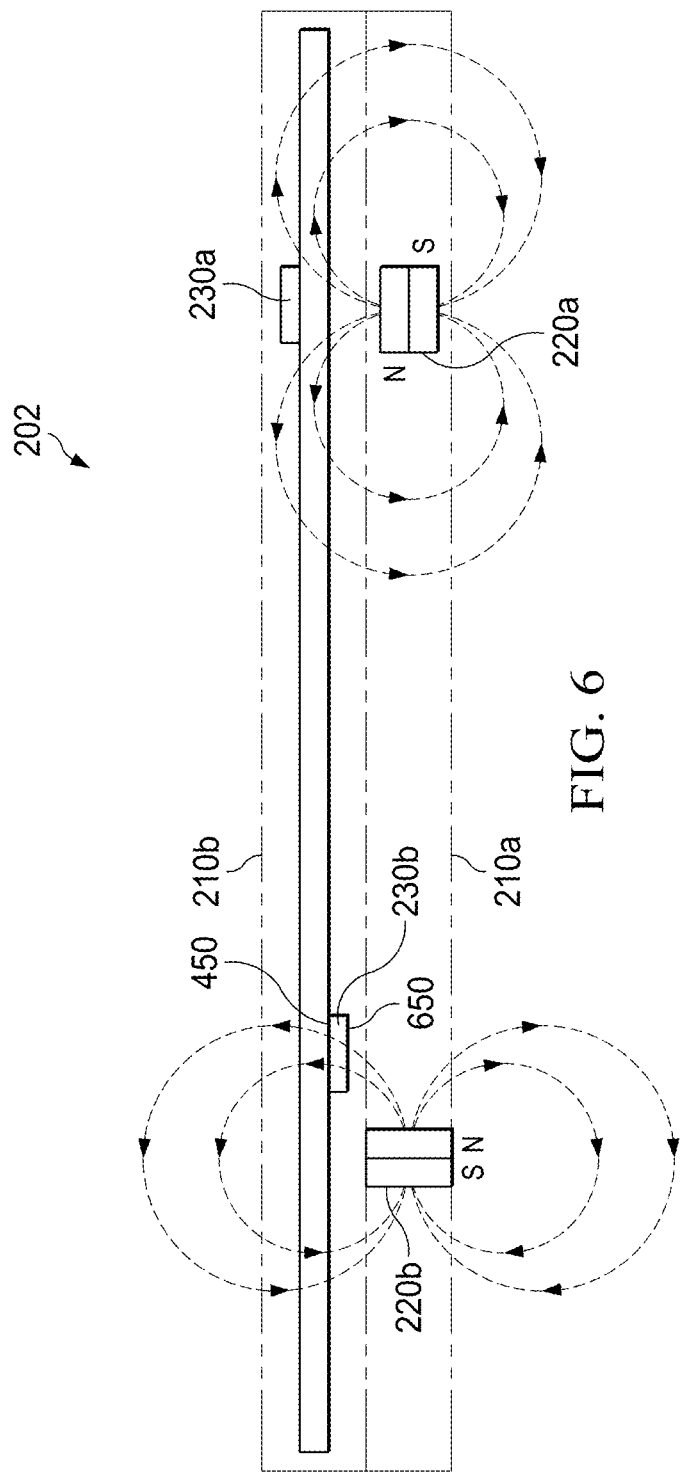
FIG. 6 illustrates a perspective view of the information handling system, in a tablet state.

FIG. 6 illustrates the information handling system 202, in a tablet state. To that end, when the information handling system 202 is in the tablet state, the outputs of the sensors 230 can indicate certain respective states that are reflective of the information handling system 202 being in the tablet state. Specifically, when the information handling system 202 is in the tablet state, the first sensor 230a can detect the magnetic fields generated by the first magnet 220a, and generate an output in a second state indicating such (e.g., a "high" state). Further, when the information handling system 202 is in the tablet state, the second sensor 230b can detect the magnetic fields generated by the second magnet 220b in a second direction (e.g., the second magnet 220b is "below" the second sensor 230b), and generate a first output in the first state (e.g., a "low" state) and generates a second output in the second state (e.g., a "high" state) to indicate such (the second direction opposite to the first direction). Thus, when the output of the first sensor 230a is in the second state, the first output of the second sensor 230b is in the first state, and the second output of the second sensor 230b is in the second state, the power state management computing module 212 can receive data indicating such outputs, and based on such, determine that the information handling system 202 is in the tablet state.

In some examples, the second sensor 230b detects the magnetic fields generated by the second magnet 220b from a second side 650 of the sensor 230b (the second side 650 opposite to the first side 450). That is, the second sensor 230b detects the magnetic fields generated by the second magnet 220b as the magnetic fields encounter the second side 650 of the second sensor 230b. Thus, the second sensor 230b, based on detecting the magnetic fields from the second side 650 of the second sensor 230b, can determine a positional relationship of the second magnet 220b with respect to the second sensor 230b. Specifically, the second sensor 230b, based on detecting the magnetic fields from the second side 650 of the second sensor 230b, generates the first output in the first state (e.g., a "low" state) and generates the second output in the second state (e.g., a "high" state) to indicate the positional relationship of the second magnet 220b with respect to the second sensor 230b (e.g., the second magnet 220b is "below" the second sensor 230b).

In some examples, when the information handling system 202 is in the tablet state, the information handling system 202 can be considered to be in a working power state. For example, a working power state of the information handling system 202 can include a S0 power state.

Figure 7:
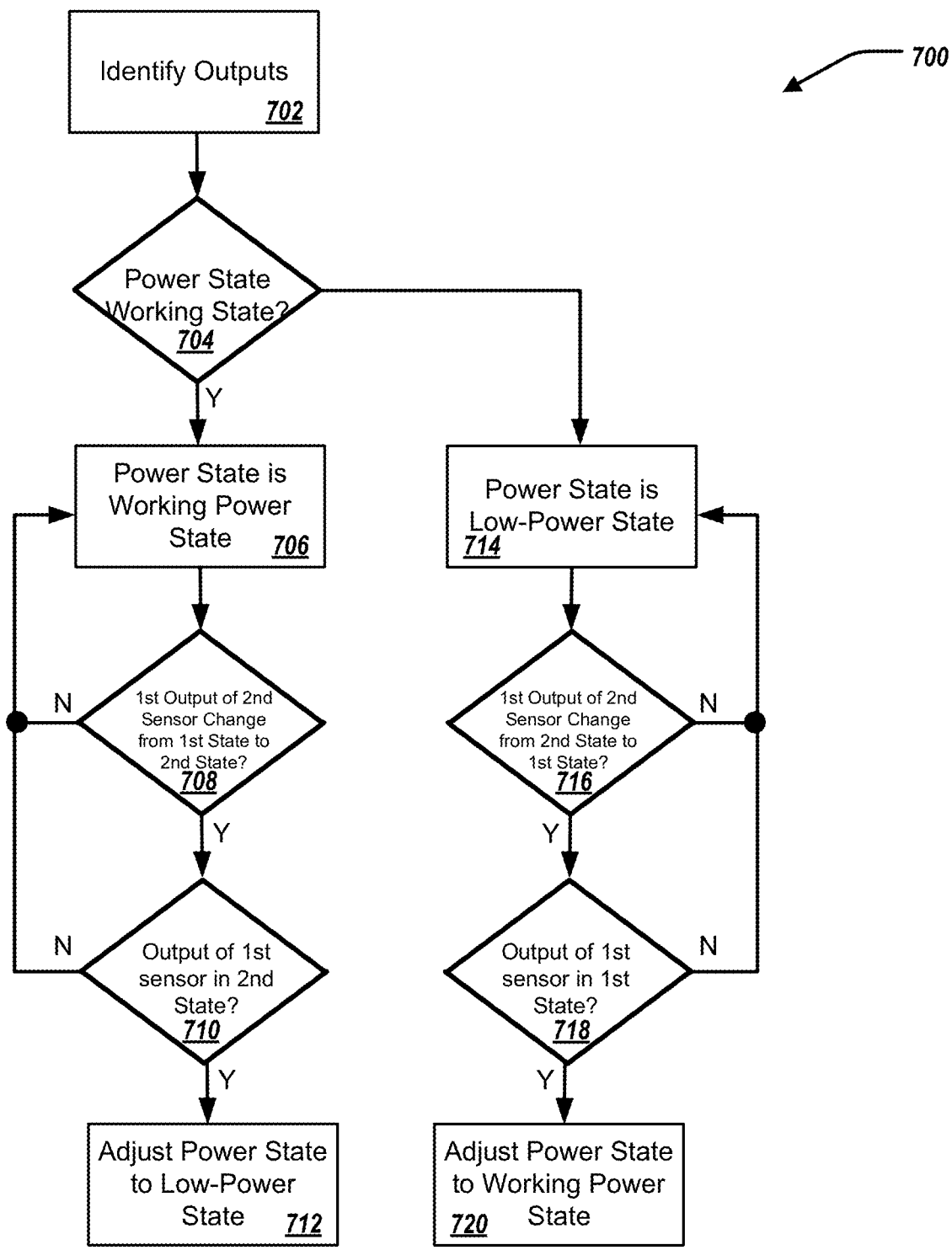
FIG. 7 illustrates a method for managing power states of the information handling system.

FIG. 7 illustrates a flowchart depicting selected elements of an embodiment of a method 700 for managing power states of the information handling system 202. The method 700 may be performed by the information handling system 100, the information handling system 202, the power state management computing module 212, and/or the sensors 230, and with reference to FIGS. 1-6 and 8-11. It is noted that certain operations described in method 700 may be optional or may be rearranged in different embodiments.

The power state management computing module 212 can identify, at a first time, an output of the first sensor 230a, a first output of the second sensor 230b, and a second output of the second sensor 230b, at 702. Specifically, the sensors 230 provide data indicating the respective outputs to the power state management computing module 212 automatically, or response to a request. In some examples, the sensors 230 can provide data indicating the respective outputs to the power state management computing module 212 at predetermined intervals (e.g., every 10 ms, 1 second, or 1 minute). The power state management computing module 212 can determine, based on the outputs of the sensors 230, a power state of the information handling system 202, at 704. In some examples, the power state management computing module 212 can determine, based on the outputs of the sensors 230, that the power state of the information camera system 202 is a working power state (e.g., a S0 power state). For example, the power state management computing module 212 can determine that the information handling system 202 is in the working power state when the output of the first sensor 230a is in the first state, the first output of the second sensor 230b is in the first state, and the second output of the second sensor 230b is in the first state (e.g., as shown in FIG. 5). The information handling system 202 is in the working power state, at 706.

The power state management computing module 212, and in response to determining that the information handling system 202 is in the working power state, and at a second time after the first time, determines whether the first output of the second sensor 230b has changed from the first state to the second state, at 708. In some examples, the power state management computing module 212 determines that the first output of the second sensor 230b has changed from the first state to the second state. That is, the power state management computing module 212 can receive additional data from the second sensor 230b indicating that the first output of the second sensor 230b has changed from the first state to the second state. The power state management computing module 212, in response to determining that the first output of the second sensor 230b has changed from the first state to the second state, determines whether the output of the first sensor 230a is in the second state, at 710. In some examples, the power state management computing module 212 determines that the output of the first sensor 230a is in the second state. That is, the policy management computing module 212 can receive additional data from the first sensor 230a indicating that the output of the first sensor 230a is in the second state. The power state management computing module 212 in response to determining that the output of the first sensor 230a is in the second state, adjusts the power state of the information handling system 202 to the low-power state, at 712.

For example, the information handling system 202 is in the open state, as shown in FIG. 5, and in the working power state, at a first time (the output of the first sensor 230a is in the first state, the first output of the second sensor 230b is in the first state, and the second output of the second sensor 230b is in the first state). A user can "close" the information handling system 202 (e.g., rotate the first body 210a to "close" the information handling system 202) to place the information handling system 202 in the closed state, as shown in FIG. 4. When the information handling system 202 is placed in the closed state, the outputs of the sensors 230 now are the output of the first sensor 230a is in the second state, the first output of the second sensor 230b is in the second state, and the second output of the second sensor 230b is in the first state. In the context of FIG. 7, the power state management computing module 212 determines that the first output of the second sensor 230b has changed from the first state to the second state (at 708). In response to such, the power state management computing module 212 determines that the output of the first sensor 230a is in the second state (at 710). Continuing, the power state management computing module 212 adjust the power state of the information handling system 202 to the low-power state (at 712).

In some examples, the power state management computing module 212, in response to determining that the first output of the second sensor 230b has changed from the first state to the second state, determines that the output of the first sensor 230a is in the first state (at 710). That is, the policy management computing module 212 can receive additional data from the first sensor 230a indicating that the output of the first sensor 230a is in the first state (e.g. remains in the first state). The power state management computing module 212 in response to determining that the output of the first sensor 230a is in the first state, maintains the power state of the information handling system 202 as the working power state, at 706.

Figure 9:
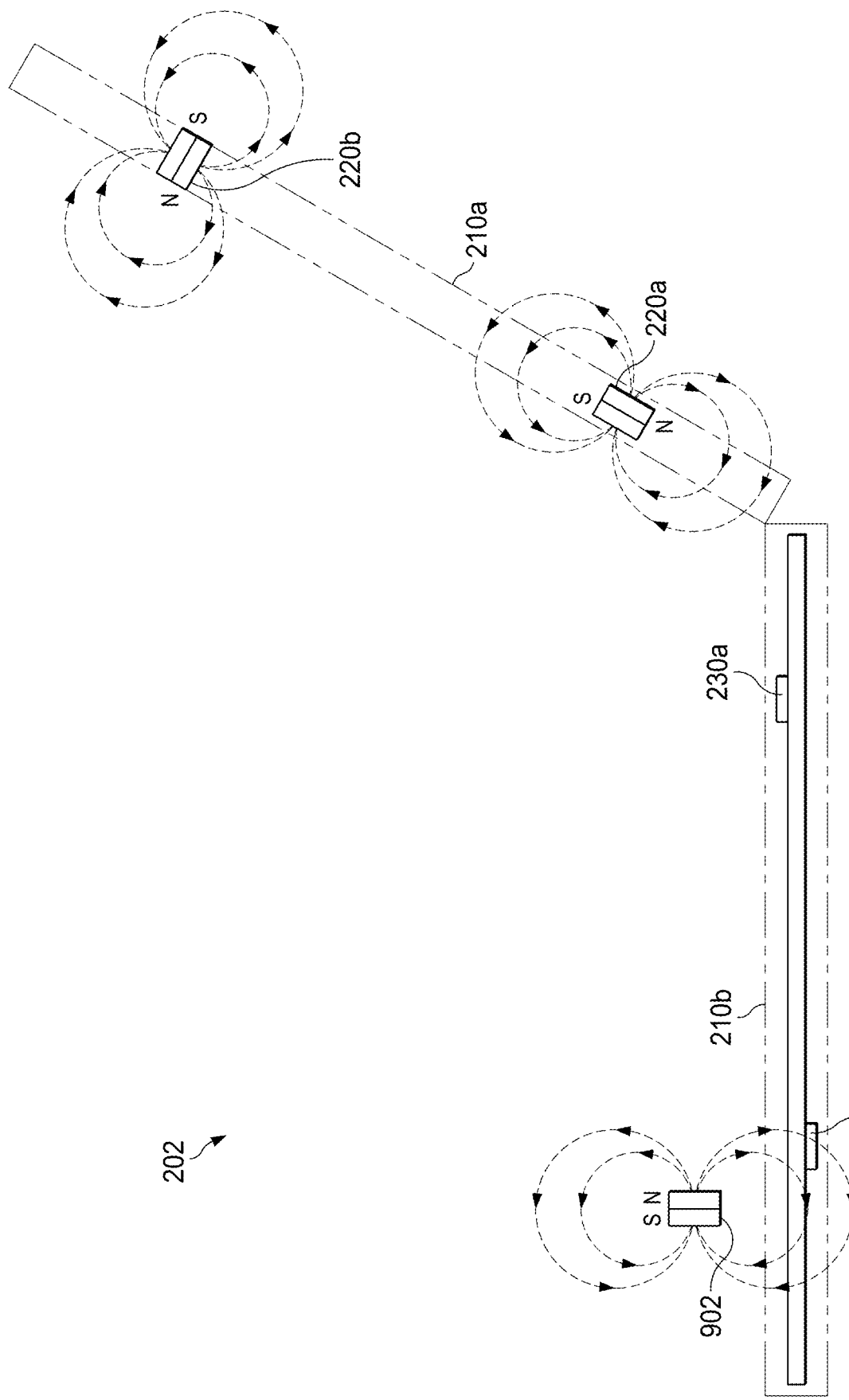
FIG. 9 illustrates a perspective view of the information handling system, in an open state, with an additional magnet that is proximate to the information handling system.

For example, the information handling system 202 is in the open state, as shown in FIG. 5, and in the working power state, at a first time (the output of the first sensor 230a is in the first state, the first output of the second sensor 230b is in the first state, and the second output of the second sensor 230b is in the first state). As shown in FIG. 9, a user can position an additional magnet 902 proximate to the second sensor 230b (e.g., a wearable computing device including the magnet 902 such as a "smartwatch"). When the additional magnet 902 is placed proximate to the second sensor 230b, the outputs of the sensors 230 now are the output of the first sensor 230a is in the first state, the first output of the second sensor 230b is in the second state, and the second output of the second sensor 230b is in the first state. In the context of FIG. 7, the power state management computing module 212 determines that the first output of the second sensor 230b has been changed from the first state to the second state (at 708). In response to such, the power state management computing module 212 determines that the output of the first sensor 230a is in the first state (at 710). Continuing, the power state management computing module 212 maintains the power state of the information handling system 202 as the working power state (at 706).

In some examples, the power state management computing module 212, and in response to determining that the information handling system 202 is in the working power state, and at a second time after the first time, determines that the first output of the second sensor 230*b* is unchanged (remains in the first state) (at 708). The power state management computing module 212, in response to determining that the first output of the second sensor 230*b* is unchanged, maintains the power state of the information handling system 202 as the working power state, at 706.

Figure 8:
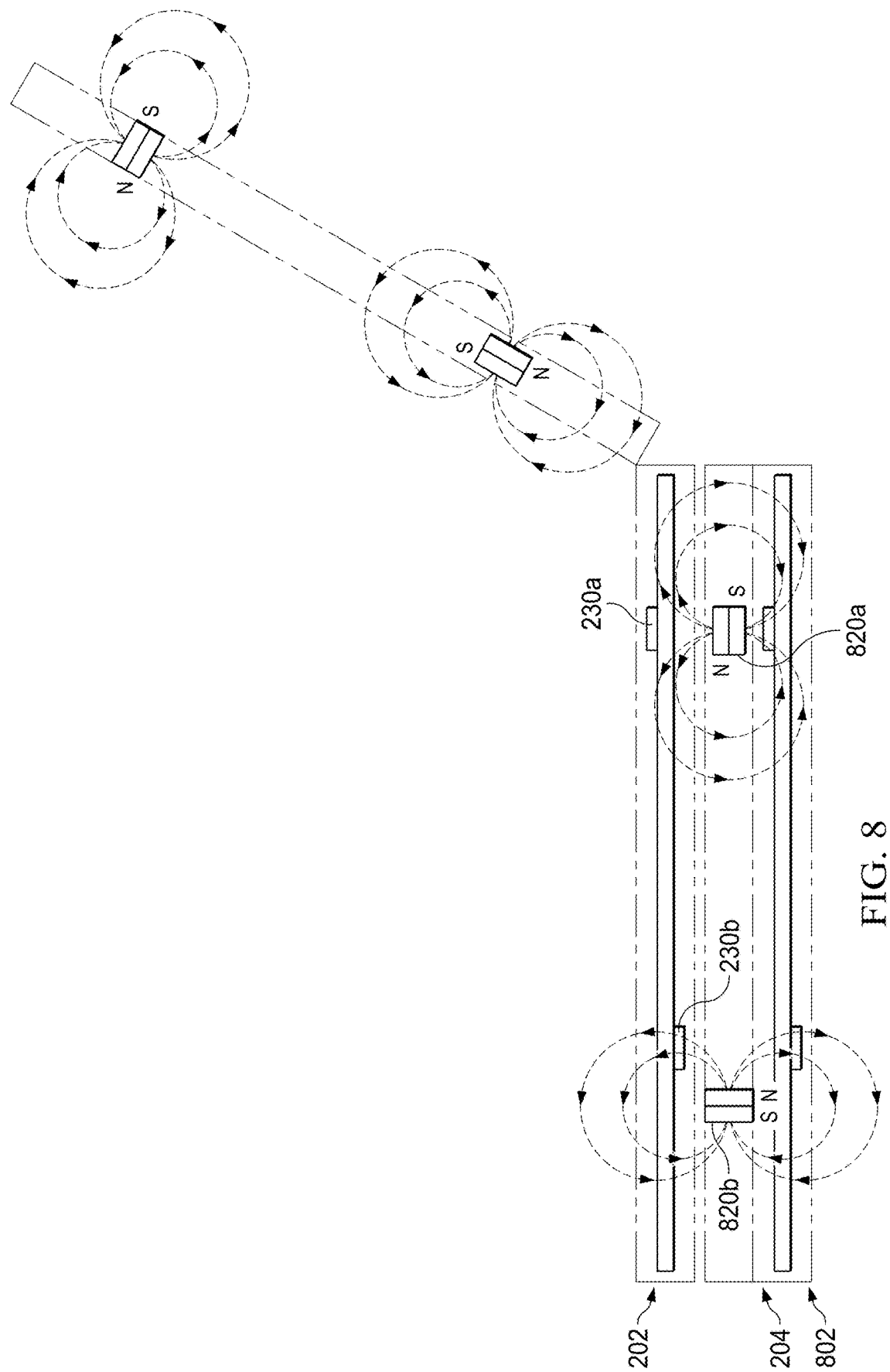
FIG. 8 illustrates a perspective view of the information handling system, in an open state, stacked on another information handling system.

For example, the information handling system 202 is in the open state, as shown in FIG. 5, and in the working power state, at a first time (the output of the first sensor 230*a* is in the first state, the first output of the second sensor 230*b* is in the first state, and the second output of the second sensor 230*b* is in the first state). As shown in FIG. 8, a user can stack the information handling system 202 upon another information handling system 802. The another information handling system 802 can include magnets 820*a* and 820*b*. When the information handling system 202 is stacked on the another information handling system 802, the magnet 820*a* can be positioned proximate to the first sensor 230*a* and the magnet 820*b* can be positioned proximate to the second sensor 230*b*. When the information handling system 202 is stacked upon another information handling system 802, the outputs of the sensors 230 now are the output of the first sensor 230*a* is in the second state, the first output of the second sensor 230*b* is in the first state, and the second output of the second sensor 230*b* is in the second state. In the context of FIG. 7, the power state management computing module 212 determines that the first output of the second sensor 230*b* is unchanged (remains in the first state) (at 708). In response to such, the power state management computing module 212 maintains the power state of the information handling system 202 as the working power state (at 706).

Figure 10:
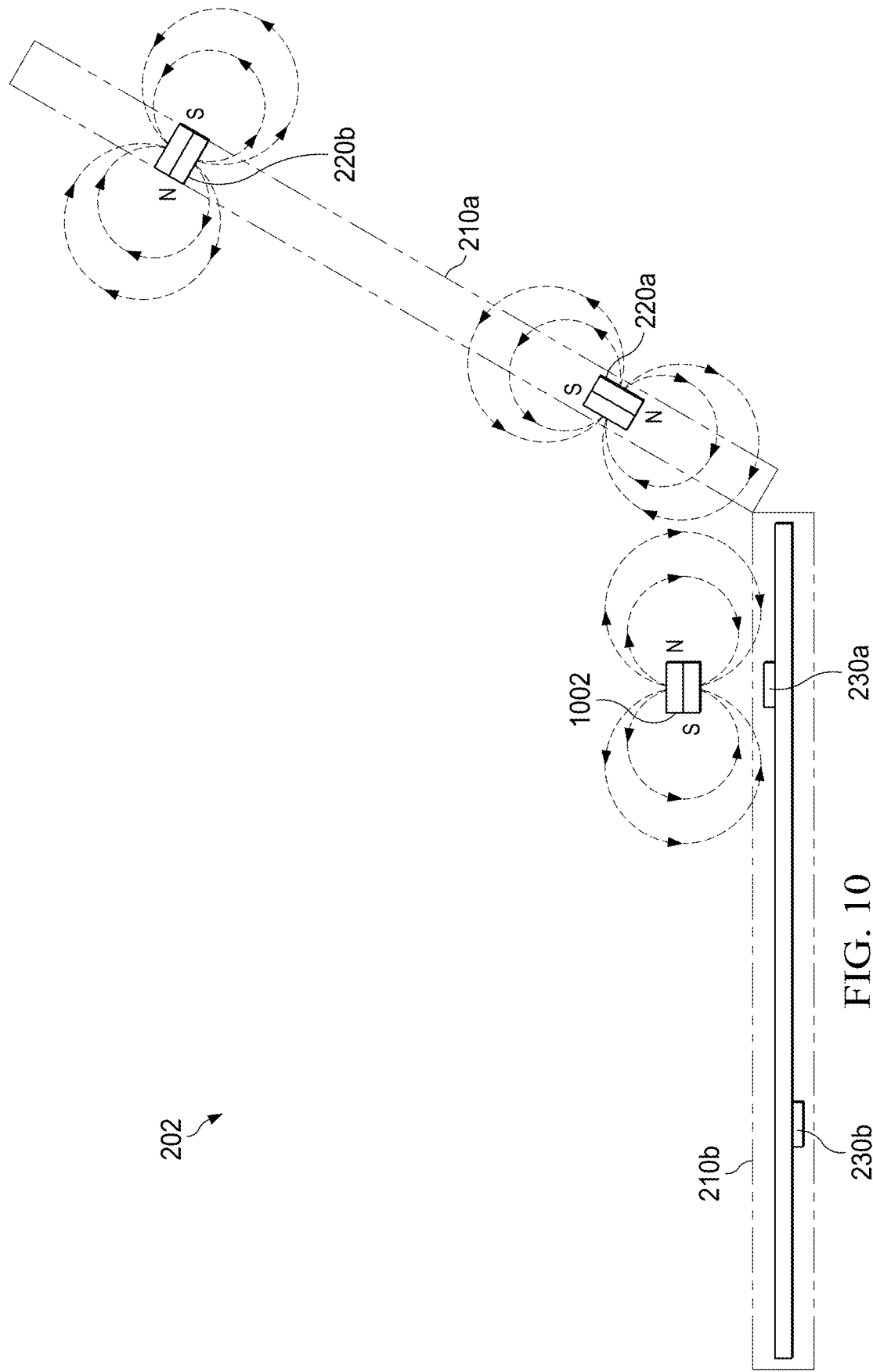
FIG. 10 illustrates a perspective view of the information handling system, in an open state, with an additional magnet that is proximate to the information handling system.

For example, the information handling system 202 is in the open state, as shown in FIG. 5, and in the working power state, at a first time (the output of the first sensor 230*a* is in the first state, the first output of the second sensor 230*b* is in the first state, and the second output of the second sensor 230*b* is in the first state). As shown in FIG. 10, a user can position an additional magnet 1002 proximate to the first sensor 230*a* (e.g., a wearable computing device include the magnet 1002 such as a "smartwatch"). When the additional magnet 1002 is placed proximate to the first sensor 230*a*, the outputs of the sensors 230 now are the output of the first sensor 230*a* is in the second state, the first output of the second sensor 230*b* is in the first state, and the second output of the second sensor 230*b* is in the first state. In the context of FIG. 7, the power state management computing module 212 determines that the first output of the second sensor 230*b* is unchanged (remains in the first state) (at 708). In response to such, the power state management computing module 212 maintains the power state of the information handling system 202 as the working power state (at 706).

Referring back to FIG. 7, in some examples, the power state management computing module 212 can determine, based on the outputs of the sensors 230, that the power state of the information handling system 202 is in a low-power state (e.g., a S5 power state) (at 704). For example, the power state management computing module 212 can determine that the information handling system 202 is in the low-power state when the output of the first sensor 230*a* is in the second state, the first output of the second sensor 230*b* is in the second state, and the second output of the second sensor 230*b* is in the first state (e.g., as shown in FIG. 4). The information handling system 202 is in the low-power state, at 714.

The power state management computing module 212, and in response to determining that the information handling system 202 is in the low-power state, and at a second time after the first time, determines whether the first output of the second sensor 230*b* has changed from the second state to the first state, at 716. In some examples, the power state management computing module 212 determines that the first output of the second sensor 230*b* has changed from the second state to the first state. That is, the power state management computing module 212 can receive additional data from the second sensor 230*b* indicating that the first output of the second sensor 230*b* has changed from the second state to the first state. The power state management computing module 212, in response to determining that the first output of the second sensor 230*b* has changed from the second state to the first state, determines whether the output of the first sensor 230*a* is in the first state, at 718. In some examples, the power state management computing module 212 determines that the output of the first sensor 230*a* is in the first state. That is, the power state management computing module 212 can receive additional data from the first sensor 230*a* indicating that the output of the first sensor 230*a* is in the first state. The power state management computing module 212, in response to determining that the output of the sensor 230*a* is in the first state, adjusts the power state of the information handling system 202 to the working power state, at 720.

For example, the information handling system 202 is in the closed state, as shown in FIG. 4, and in the low-power state, at a first time (the output of the first sensor 230*a* is in the second state, the first output of the second sensor 230*b* is in the second state, and the second output of the second sensor 230*b* is in the first state). A user can "open" the information handling system 202 (e.g., rotate the first body 210*a* to "open" the information handling system 202) to place the information handling system 202 in the open state, as shown in FIG. 5. When the information handling system 202 is placed in the open state, the outputs of the sensors 230 now are the output of the first sensor 230*a* is in the first state, the first output of the second sensor 230*b* is in the first state, and the second output of the second sensor 230*b* is in the first state. In the context of FIG. 7, the power state management computing module 212 determines that the first output of the second sensor 230*b* has changed from the second state to the first state (at 716). In response to such, the power state management computing module 212 determines that the output of the first sensor 230*a* is in the first state (at 718). Continuing, the power state management computing module 212 adjusts the power state of the information handling system 202 to the working power state (at 712).

In some examples, the power state management computing module 212, in response to determining that the first output of the second sensor 230*b* has changed to the first state, determines that the output of the first sensor 230*a* is in the second state (at 718). That is, the power state management computing module 212 can receive additional data from the first sensor 230*a* indicating that the output of the first sensor 230*a* is in the second state (e.g. remains in the second state). The power state management computing module 212 in response to determining that the output of the first sensor 230*a* is in the second state, maintains the power state of the information handling system 202 as the low-power state, at 714.

For example, the information handling system 202 is in the closed state, as shown in FIG. 4, and in the low-power state, at a first time (the output of the first sensor 230*a* is in the second state, the first output of the second sensor 230*b* is in the second state, and the second output of the second sensor 230*b* is in the first state). As shown in FIG. 11, a user can stack the information handling system 202 upon another information handling system 1102. The another information handling system 1102 can include magnets 1120a and 1120b. When the information handling system 202 is stacked on the another information handling system 1102, the magnet 1120a can be positioned proximate to the first sensor 230a and the magnet 1120b can be positioned proximate to the second sensor 230b. When the information handling system 202 is stacked upon another information handling system 1102, the outputs of the sensors 230 now are the output of the first sensor 230a is in the second state, the first output of the second sensor 230b is in the first state, and the second output of the second sensor 230b is in the first state. In the context of FIG. 7, the power state management computing module 212 determines that the first output of the second sensor 230b has been changed from the second state to the first state (at 716). In response to such, the power state management computing module 212 determines that the output of the first sensor 230a is in the second state (at 718). Continuing, the power state management computing module 212 maintains the power state of the information handling system 202 as the low-power state (at 714).

In some examples, the power state management computing module 212, and in response to determining that the information handling system 202 is in the low-power state, and at a second time after the first time, determines that the first output of the second sensor 230b is unchanged (remains in the second state) (at 716). The power state management computing module 212, in response to determining that the first output of the second sensor 230b is unchanged, maintains the power state of the information handling system 202 as the low-power state, at 714.

For example, the information handling system 202 is in the closed state, as shown in FIG. 4, and in the low-power state, at a first time (the output of the first sensor 230a is in the second state, the first output of the second sensor 230b is in the second state, and the second output of the second sensor 230b is in the first state). A user can position an additional magnet (not shown) proximate to the second sensor 230b (e.g., a wearable computing device including the magnet such as a "smartwatch"). When the additional magnet is placed proximate to the second sensor 230b, the outputs of the sensors 230 now are the output of the first sensor 230a is in the second state, the first output of the second sensor 230b is in the first state, and the second output of the second sensor 230b is in the first state. In the context of FIG. 7, the power state management computing module 212 determines that the first output of the second sensor 230b has changed from the second state to the first state (at 716). In response to such, the power state management computing module 212 determines that the output of the first sensor 230a is in the second state (at 718). Continuing, the power state management computing module maintains the power state of the information handling system 202 as the low-power state (at 714).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of managing power states of an information handling system, including:
    identifying, at a first time, an output of a first sensor, a first output of a second sensor, and a second output of the second sensor, the first sensor and the second sensor detecting a presence of one or more magnetic fields of one or more magnets, the first sensor positioned at a first end of a first body of a two-body information handling system, the second sensor positioned at a second end of the first body of the first body of the two-body information handling system, the second end of the first body opposite to the first end of the first body, a first magnet of the one or more magnets positioned at a first end of a second body of the two-body information handling system and along a first axis, a second magnet of the one or more magnets positioned at a second end of the second body of the two-body information handling system along a second axis, the second end of the second body opposite to the first end of the second body, the second axis orthogonal to the first axis;
    detecting, by the second sensor and based on the second magnet being transverse to the first magnet, a directionality of the one or more magnetic fields at the second sensor;
    determining, based on the output of the first sensor and the first and the second output of the second sensor including the directionality of the magnetic fields of the second magnet at the second sensor that a power state of the information handling system as a working power state;
    in response to determining that the information handling system is in the working power state, and at a second time after the first time:
        determining that the first output of the second sensor changed from a first state to a second state;

in response to determining that the first output of the second sensor changed to the second state, determining that the output of the first sensor is in the second state; and in response to determining that the output of the first sensor is in the second state, adjusting the power state of the information handling system to a low-power state.

2. The method of claim 1, further in response to determining that the first output of the second sensor changed from the first state to the second state, determining that the output of the first sensor is in the first state; and in response to determining that the output of the first sensor is in the first state, maintaining the power state of the information handling system as the working power state.

3. The method of claim 1, in response to determining that the information handling system is in the working power state, determining that the first output of the second sensor is unchanged; and in response to determining that first output of the second sensor is unchanged, maintaining the power state of the information handling system as the working power state.

4. The method of claim 1, further including:

determining, based on the output of the first and the first and the second output of the second sensor, that the power state of the information handling system as the low-power state;

in response to determining that the information handling system is in the low-power state, and at the second time after the first time:

determining that the first output of the second sensor changed from the second state to the first state;

in response to determining that the first output of the second sensor changed from the to the first state, determining that the output of the first sensor is in the first state; and in response to determining that the output of the first sensor is in the first state, adjusting the power state of the information handling system to the working power state.

5. The method of claim 4, further in response to determining that the first output of the second sensor changed from the second state to the first state, determining that the output of the first sensor is the second state; and in response to determining that the output of the first sensor is in the second state, maintaining the power state of the information handling system as the low-power state.

6. The method of claim 4, in response to determining that the information handling system is in the low-power state, determining that the first output of the second sensor is unchanged; and in response to determining that first output of the second sensor is unchanged, maintaining the power state of the information handling system as the low-power state.

7. The method of claim 1, wherein the first sensor, the second sensor, or both are Hall sensors.

8. The method of claim 1, wherein the first sensor, the second sensor, or both are giant magnetoresistance (GMR) sensors.

9. The method of claim 1, wherein the first state indicates no detection of the one or more magnetic fields, and the second state indicates a detection of the one or more magnetic fields.

10. A two-body information handling system, comprising:
a first body;
a second body;
a first sensor positioned at a first end of the first body;
a second sensor positioned at a second end of the first body, the second end opposite to the first end;
a processor;
computer-readable medium storing instructions executable by the processor to perform operations which, upon such execution, cause the processor to perform operations comprising:
identifying, at a first time, an output of a first sensor, a first output of a second sensor, and a second output of the second sensor, the first sensor and the second sensor detecting a presence of one or more magnetic fields of one or more magnets, the first sensor positioned at a first end of a first body of a two-body information handling system, the second sensor positioned at a second end of the first body of the first body of the two-body information handling system, the second end of the first body opposite to the first end of the first body, a first magnet of the one or more magnets positioned at a first end of a second body of the two-body information handling system and along a first axis, a second magnet of the one or more magnets positioned at a second end of the second body of the two-body information handling system along a second axis, the second end of the second body opposite to the first end of the second body, the second axis orthogonal to the first axis;
detecting, by the second sensor and based on the second magnet being transverse to the first magnet, a directionality of the one or more magnetic fields at the second sensor;
determining, based on the output of the first sensor and the first and the second output of the second sensor including the directionality of the magnetic fields of the second magnet at the second sensor, that a power state of the information handling system as a working power state;
in response to determining that the information handling system is in the working power state, and at a second time after the first time:
determining that the first output of the second sensor changed from a first state to a second state;
in response to determining that the first output of the second sensor changed to the second state, determining that the output of the first sensor is in the second state; and
in response to determining that the output of the first sensor is in the second state, adjusting the power state of the information handling system to a low-power state.

11. The information handling system of claim 10, the operations further comprising:
further in response to determining that the first output of the second sensor changed from the first state to the second state, determining that the output of the first sensor is in the first state; and
in response to determining that the output of the first sensor is in the first state, maintaining the power state of the information handling system as the working power state.

12. The information handling system of claim 10, the operations further comprising:
    in response to determining that the information handling system is in the working power state, determining that the first output of the second sensor is unchanged; and
    in response to determining that first output of the second sensor is unchanged, maintaining the power state of the information handling system as the working power state.

13. The information handling system of claim 10, the operations further comprising:
    determining, based on the output of the first and the first and the second output of the second sensor, that the power state of the information handling system as the low-power state;
    in response to determining that the information handling system is in the low-power state, and at the second time after the first time:
        determining that the first output of the second sensor changed from the second state to the first state;
        in response to determining that the first output of the second sensor changed from the to the first state, determining that the output of the first sensor is in the first state; and
        in response to determining that the output of the first sensor is in the first state, adjusting the power state of the information handling system to the working power state.

14. The information handling system of claim 13, the operations further comprising:
    further in response to determining that the first output of the second sensor changed from the second state to the first state, determining that the output of the first sensor is the second state; and
    in response to determining that the output of the first sensor is in the second state, maintaining the power state of the information handling system as the low-power state.

15. The information handling system of claim 13, the operations further comprising:
    in response to determining that the information handling system is in the low-power state, determining that the first output of the second sensor is unchanged; and
    in response to determining that first output of the second sensor is unchanged, maintaining the power state of the information handling system as the low-power state.

16. The information handling system of claim 10, wherein the first sensor, the second sensor, or both are Hall sensors.

17. The information handling system of claim 10, wherein the first sensor, the second sensor, or both are giant magnetoresistance (GMR) sensors.

18. The information handling system of claim 10, wherein the first state indicates no detection of the one or more magnetic fields, and the second state indicates a detection of the one or more magnetic fields.

* * * * *